United States Patent Office 3,093,256
Patented June 11, 1963

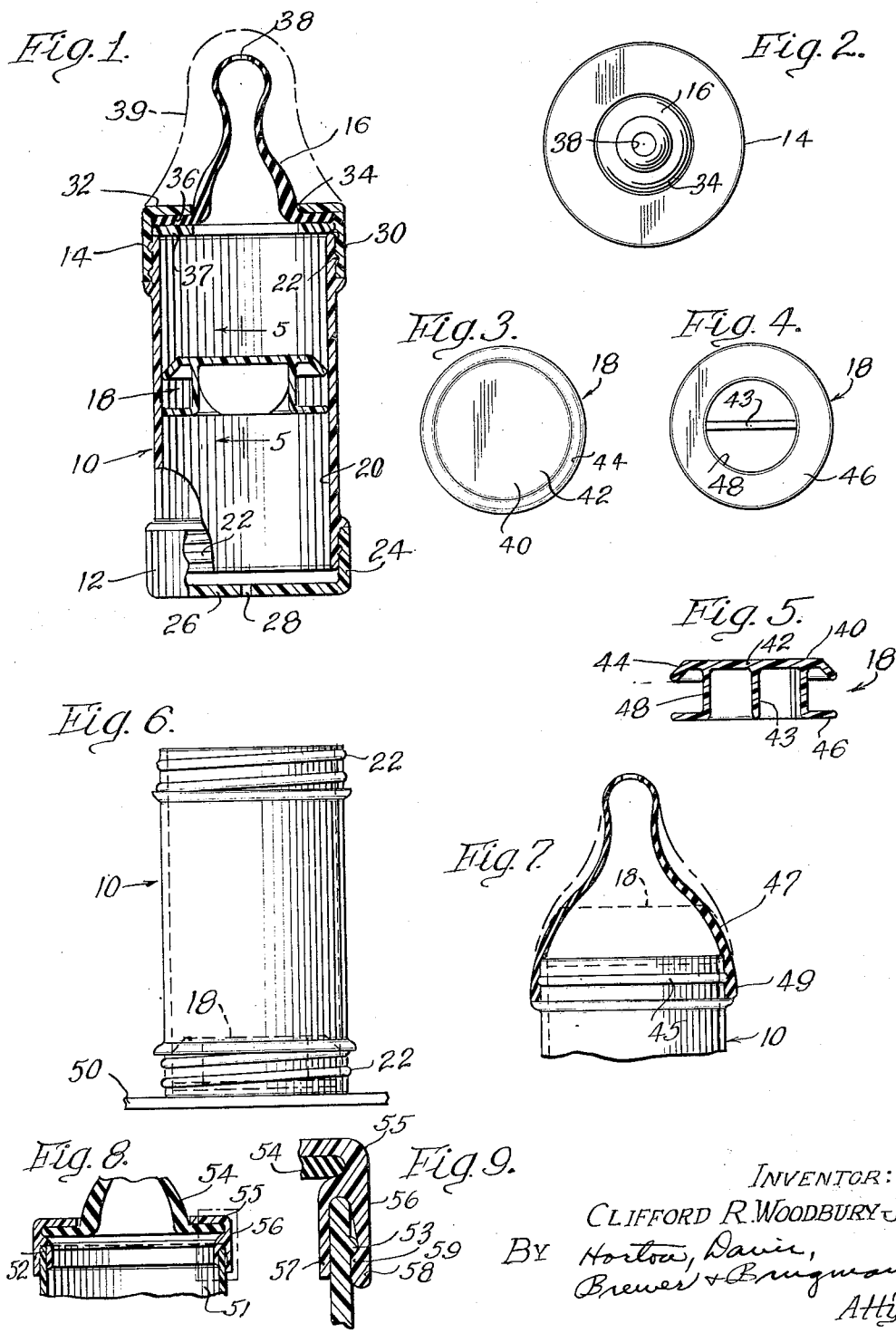

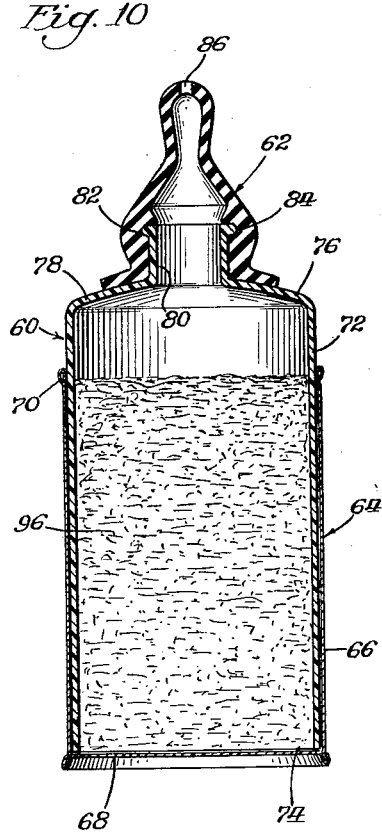
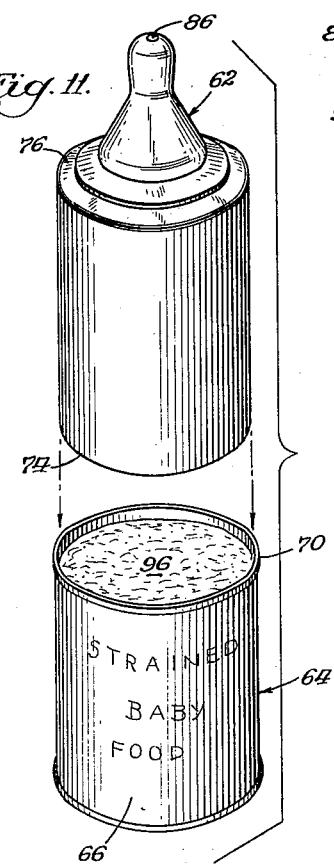
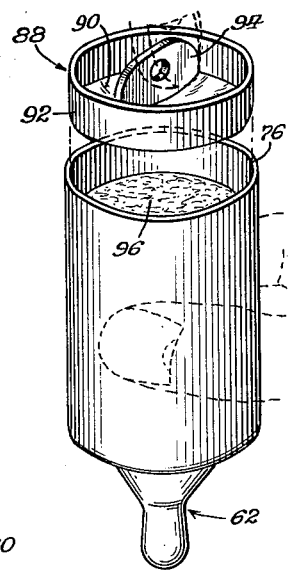
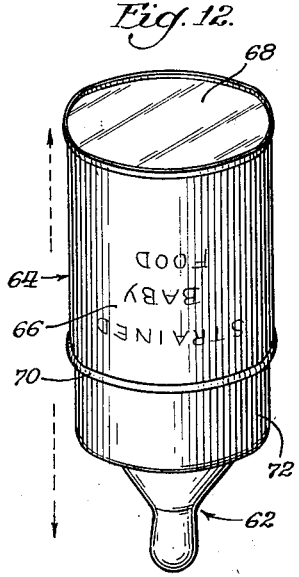
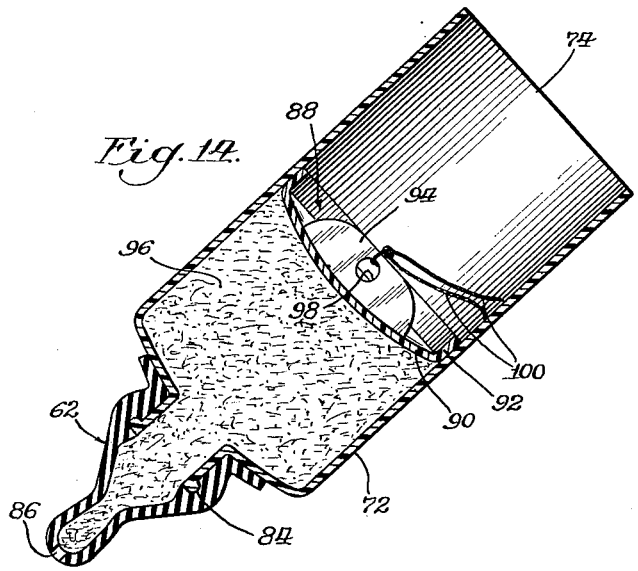
INVENTOR.
CLIFFORD R. WOODBURY, JR.

3,093,256
BABY FOOD FEEDER
Clifford R. Woodbury, Jr., 7747 N. Hermitage Ave., Chicago, Ill.
Filed Jan. 26, 1960, Ser. No. 4,677
5 Claims. (Cl. 215—11)

The present invention relates to baby food feeders, and more particularly to such feeders utilizing the vacuum principle and a nipple.

A broad object of the invention is to provide a feeder of the character noted which includes a free-floating piston or follower therein in engagement with the contents contained in the feeder and operative for forcing the contents into and through the nipple under the influence of atmospheric pressure in response to withdrawal of the contents through the nipple by sucking, which produces a partial vacuum.

A further and important object of the invention is to provide a baby food feeder of the foregoing character which is effective in its functioning regardless of the position it assumes.

One of the primary purposes of the present invention is the utilization of the principle involved in feeding a baby fluids by means of a nursing bottle, namely, the natural sucking instinct of the baby upon a nipple. By application of this principle in conjunction with a feeding device of the nature to be described herein, a baby may be fed strained and semi-solid foods as well as milk, i.e., any food that flows by itself or under a slight degree of pressure. And although the present invention is intended primarily for utilizing the aforementioned principle in the early feeding of strained and semi-solid foods, it is rendered more important by reason of the fact that it can also be utilized to feed a baby fluids such as milk and fruit juices in a manner which is superior to the present-day apparatus that, in order to function properly, require (1) a particular retained tilt of the apparatus and (2) the introduction of air into the same area of the apparatus which contains the fluid, thus making possible, and usually causing, an amount of air to be swallowed by the infant along with the fluid. In the present invention, this is not possible, because the proper functioning of the invention requires the exclusion of air from the area of the feeder which contains the food or liquid.

The present invention is most important in that it is specifically designed to be utilized for feeding strained and semi-solid foods to babies, because in the absence of use of such a feeder, a baby is forced to make a difficult and sometimes emotionally upsetting transition from the milk-nipple stage to the food-spoon stage of development. By utilizing a feeder of the present invention, this difficulty is overcome by reason of the fact that a baby may be fed strained and semi-solid foods, without their being diluted, through an apparatus which utilizes the same instincts and actions in the baby as when feeding it liquids by means of a nursing bottle, while at the same time, the baby is becoming familiar with the many new tastes and textures of strained and semi-solid foods via the familiar nipple, thus facilitating the early introduction of a spoon for feeding baby without the additional barrier to the baby of taking a foreign substance from this foreign and unfamiliar object, the spoon. Also, upon the discovery by the baby that the substance in the spoon is a familiar substance which he has now learned to accept and enjoy, the spoon barrier is crossed without any emotional upset of baby or strain on mother.

Consequently, one of the primary objects of this invention is to provide a new and novel apparatus, which includes a nipple thereon in order to utilize the natural sucking instinct of a baby, for the purpose of feeding it strained, semi-solid and liquid foods in a new and novel manner which eliminates many of the attendant problems that exist presently in the feeding of a baby.

A further object of the invention is to provide a device of the character just referred to, in the proper use of which it is virtually impossible for the baby to draw in air, instead of food or liquid, in using the device, thereby eliminating the distressing difficulties connected with drawing in too much air and the necessity of "burping" the baby.

A further object is to provide, in one form of the invention, a device of the foregoing character into which food can be transferred from the original container in which it is purchased by inserting the device into that container, manipulating the two members, and transferring the food bodily and totally, without the necessity of spooning it out portion-by-portion, or other similar means.

Still another object is to provide a device for feeding a baby strained or semi-solid food, in the use of which, the difficult transition from feeding milk in a nursing bottle to feeding semi-solid food in a spoon is eliminated.

Still another object is to provide a feeder of the foregoing general character which can easily and conveniently be used for feeding a baby strained or semi-solid foods while travelling, without the usual accompanying inconveniences, the greatest being that of food spillage, which is eliminated.

A further object of the invention is to provide a baby food feeder for feeding semi-solid foods that substantially eliminates spillage of food, and hence is extremely effective for saving time and money as well as eliminating messiness.

A still further object of the invention is to provide a baby food feeder of the foregoing character which is of special construction as to provide the highest degree of sanitation.

Another object is to provide a baby food feeder of the foregoing general character in which a piston or follower is utilized to exclude the introduction of air into that portion of the feeder in which the food or liquid is contained, said piston following the level of the food as it is being consumed, and in which the piston or follower is the only movable part and is contained entirely within the container.

Other objects and advantages of the invention will appear from the following detailed description taken in conjunction with the accompanying drawings, in which:

FIGURE 1 shows one form of the baby food feeder of the present invention, mainly in longitudinal section but with a small portion in elevation;

FIG. 2 is a top view of the device;

FIG. 3 is a top view of the piston used in the device;

FIG. 4 is a bottom view of the piston;

FIG. 5 is a sectional view of the piston taken on line 5—5 of FIG. 1;

FIG. 6 is a view of the main body portion of the container and the piston therein; and FIG. 7 is a view mainly in elevation, showing the device with a modified form of nipple.

FIG. 8 is a fragmentary longitudinal sectional view of a device generally similar to that of FIGS. 1–6, but including a different form of nipple; and FIG. 9 is a large scale detail sectional view of the portion surrounded by dot-dash lines in FIG. 8.

FIG. 10 shows a baby food feeder embodying a modified form of the invention, this being a longitudinal sectional view of the device inserted in an original container of baby food;

FIG. 11 is an exploded view, in perspective, of the feeder in FIG. 10 showing the feeder's relation to the original container of baby food and indicating the manner of using it therewith;

FIG. 12 is a perspective view of the feeder and original container in telescoped relation and in inverted position, illustrating one step in filling the device;

FIG. 13 is a perspective view of the device after filling it and removing the original container, and indicating the manner of inserting the piston; and FIG. 14 is a longitudinal sectional view of the device of FIG. 13 showing the piston inserted therein and after a portion of the contents of the container have been withdrawn.

Referring in detail to the drawings, attention is directed first to FIGS. 1 to 6 showing one form of device embodying the invention. FIG. 1 shows the baby feeder in its entirety, the main parts of which are a body member 10, a bottom cap 12, a top cap 14, a nipple 16 and a piston or follower 18.

The body member 10 is in the form of a tube or cylinder and is preferably transparent or translucent, being made of a suitable plastic material, a number of which are presently known. It may alternatively be made of glass, and it is also within the broad scope of the invention to make the body member of other materials that are not transparent, if it should for any reason be desired to do so. Preferably the body member has a cylindrical inner surface 20 of uniform diameter throughout its full extent to allow insertion of the piston 18 at either end as well as to assure proper sealing action between the follower and the inner surface 20 at all positions in the body member. The ends of the body member are provided with external threads 22 for detachable securement of the respective caps 12 and 14. And these threads are preferably identical with each other so as to accommodate either of the caps on either end.

The caps 12 and 14 as indicated above are interchangeable in that either may be attached to either end of the body member, but they are different in detail construction, cap 12 being a closure cap which, aside from aesthetic value, serves to strengthen the extremity of the body member to which it is applied, while cap 14 secures the nipple 16 onto the body member and makes a positive seal against air entering into the body member between the nipple and cap or between the nipple and body member. The cap 12 has a cylindrical flange 24 internally threaded for screwing onto the threads 22 of the body member, and includes a main portion 26 in the form of a disc having an air vent 28 therein. The other cap 14 has a cylindrical flange 30 internally threaded for screwing onto the threads 22 on the opposite end and an annular planar portion 32 extending radially inwardly from the flange, defining a central aperture 34. The nipple 16 is fitted in the central aperture 34, and its base flange 36 is butted to the lower inner flat surface of the planar portion 32 and positioned between that surface and a washer 37, and preferably is of such diameter as to engage or closely approach the inner surface of the flange 30, or at least be of such circumference as to equal the outside circumference of body member 10. When the cap 14 is threaded onto the body member 10 with the nipple in place therein as just described, the cap engages the flange on the nipple and brings itself, the nipple and the body member into firm engagement, sealing that end of the body member.

The nipple 16 may be of any suitable material commonly used at present, such as rubber or rubber-like material that is tasteless, odorless and non-toxic and has suitable elastic properties. The nipple 16 as shown is specially adapted to use with semi-solid foods and is therefore provided with an aperture 38 (FIG. 2) that is of substantially greater dimensions than in the case of a nipple used for milk. While I do not wish to be limited to any particular dimensions, I have found that an aperture 38 approximately 1/8 inch in diameter is satisfactory for passage of the semi-solid foods therethrough. When used for feeding milk, the feeder is provided with a nipple having a smaller aperture or a quantity of pin holes as is customarily used on conventional nursing bottles. If desired, an overcap 39 may be fitted over the nipple when the feeder is not in use.

The strained or semi-solid foods with which the present device is specially adapted for use include such flowable foods as strained fruits, fruit and cereal combinations, vegetables, meats, and vegetable and meat combinations, etc. These foods are presently sold in great numbers on the market and form the transition foods between milk and what are commonly known on the market as "Junior Foods." These strained "baby" foods are commonly sold in jars, as well as cans, and in the use of the present device such jars or cans are opened, and the contents emptied into the feeder of the present invention in a specific manner described herein below.

The piston 18 as noted above is free-floating, without any guiding extensions or portions projecting outside the body member 10. While the piston 18 may be of any of various forms, I have found that the form and construction to be presently described is highly satisfactory for the purpose, being inexpensive to manufacture and highly sanitary. The piston 18 preferably is in the form of an integral member formed of a suitable plastic material that retains its shape when sterilized in hot water, and includes an upper element 40 generally in the form of a disc or wafer having a main flat or generally planar and imperforate portion 42 with an annular edge portion 44 which is somewhat flexible for greater mobility while making a positive seal, even in the event of slight differences in the diameter in the inner surface of the body member 10. The annular edge portion 44 is inclined relative to the portion 42, preferably in a downward direction, but it will function satisfactorily inclined in the opposite direction. The annular portion 44 of the element 42 closely engages the inner surface of the body member and prevents any flow of food therepast, whether semi-solid or liquid, and this is true notwithstanding the fact that the portion 44 may assume a slightly irregular, or non-circular shape.

The piston also includes an axially spaced guiding portion 46 which is generally planar, but of annular shape, connected at its inner marginal edge with a cylindrical or tubular portion 48, which connects it to the upper portion 40. The guiding portion 46 is spaced axially from the portion 42 a suitable distance for performing a guiding function, that is, to keep the piston in proper position, which is perpendicular to the inner surface 20 of the body member. The guiding portion 46 need not exert pressure on the inner surface 20 of the body member, the desirable relationship being one of very slight friction when the sealing portion 40 (which includes 44) of the piston goes slightly out of alignment. Thus, the guiding portion 46 keeps the sealing portion 40 in sufficient alignment so as to preclude binding of the piston or the breaking of the positive seal made between the circumference of portion 44 of the sealing portion of the piston and the inner surface 20 of the body member. A hand grip element 43, projecting diametrically and axially, extends from the element 42 within the tubular portion 48, to facilitate manipulating the piston as in inserting it in the body member and removing it therefrom. An alternate form of piston, designated 88, is illustrated in FIGS. 11 to 14 and described hereinbelow, and may be used in the present form of feeder, if desired.

The provision of detachable caps 12 and 14 for either end of the body member results in a decided advantage from the standpoint of sanitation. Upon removal of these caps, the body member 10 may be easily cleaned, being open at both ends and having a uniform inner surface which may easily be cleaned by usual washing methods. The threads 22, constituting the only irregular surface elements are on the exterior of the body member and are easily cleaned. The caps 12 and 14 themselves are also easily cleaned. And while the threads on the caps are on the inner surfaces of flanges, the caps are shallow and the threads are large and easily accessible for cleaning.

The provision of caps at both ends of the device, and the completely identical construction of both ends of the body member 10 provide another and important advantage in filling the feeder with food. To fill the feeder with semisolid food, for example, the tubular body member 10, without caps, is first picked up, and the follower 18 inserted therein in either end thereof, and moved to a position shown in FIG. 6, after which the body member is set on a support 50.

The piston may be conveniently inserted into either end by leading with the guide portion 46 and moving the piston to the opposite end, or it may be inserted into either end by placing the sealing portion 40 in first, the down-turned peripheral portion 44 facilitating this manner of inserting it.

Cap 12 may be threaded onto that end of the body member toward which the guiding portion 46 of the piston is directed. Then the food or liquid to be fed to the baby is put into the body member through the opposite end. Any quantity of food may be put into the feeder, whether it fills the body member or not, and if desired, the piston 18 may be positioned inside the body member in closer proximity to the nipple, thereby providing a cubic area only sufficient to accommodate the intended quantity of food.

After the foregoing steps have been completed, the top cap 14 with the nipple 16 and washer 37 assembled therewith is threaded onto the upper end of the body member as illustrated in FIG. 1. The nipple 16 is fitted into the cap 14 in the usual manner, such as is common in connection with a nursing bottle used for feeding milk. Then, the threading of the cap onto the body member causes a positive seal in the manner stated above.

FIG. 7 shows a device similar to that of FIG. 1 but with a different form of nipple and arrangement for securing the nipple to the body member. In the present arrangement of FIG. 7 the body member 10 is the same as that of FIG. 1, except an external protruding rib 45 replaces the threads at one end. The device is provided with a lower cap 12 and piston 18 identical with the same elements of FIG. 1. In the present case the large bore portion of the nipple 47 is snapped over the rib 45. In this form of feeder the piston 18 may move out of the body member into the nipple, as indicated, in following the food on expulsion thereof, and thereby effect more complete expulsion of the food from the feeder.

FIGS. 8 and 9 illustrate a slight modification of construction of body member and nipple. In the present instance, the body member 51 may be generally in the form of a cylindrical tube open at both ends, the upper end 52 of which is shown. The body member has an exterior circumferential bead 53 adjacent its upper end for frictional engagement by a gripping element of the cap securing the nipple in place. The nipple in this instance is indicated at 54 and the cap at 55. The cap has a surrounding skirt portion 56 including a continuous circumferential inner flange 57 and outer flange 58 and forming in axial section a bifurcated construction. The nipple is fitted to the cap in the usual manner and the cap is fitted to the body member by inserting the upper end edge of the body member into the space between these flanges which possess a limited degree of resilience. The outer flange 58 has an inwardly extending circumferential shoulder 59 positioned for engaging under the bead 53. Due to the circular construction of the members, an effective securement therebetween is attained such as to prevent displacement of the nipple in normal feeding operations. However, the nipple may be readily removed by an adult by gripping the cap and pulling upwardly on it.

Reference may now be had to FIGS. 10 to 14 inclusive. These figures illustrate a device embodying the broad principles of the invention disclosed hereinabove, but modified therefrom and constituting a device whereby the contents of an original container of baby food can be transferred bodily and totally into the feeder by a single manipulation, as contrasted with transferring it portion-by-portion such as by spooning it. Broadly stated, the device of FIGS. 10 to 14 includes a cylinder open at one end and having a nipple at the other end. The device is designed for telescoping into the original container of baby food, and by thereafter inverting the telescoped two members and drawing them apart, all the food then rests in the baby food feeder.

The baby food feeder of FIGS. 10 to 14 includes a body member 60, having a nipple 62 fitted thereon, telescoped into a container 64 which is the original container in which the baby food is obtained. In the present instance, the container 64 is in the form of a tin can having a surrounding side wall 66 substantially or essentially cylindrical and a bottom element 68. In its original form the can is provided with a top element (not shown) similar to the bottom element 68 but removed preparatory to utilizing the baby food feeder, a bead 70 being indicated as surrounding the open top and forming the connection between the top element and the side wall.

Reference to the baby food feeder of FIGS. 10 to 14 is made from the standpoint of orientation of the device as in FIG. 10, having a lower and upper end in such orientation, but it is to be understood that the feeder may be effectively used in the feeding operation in any position at all. (In fact, this very feature constitutes an important feature of the invention.) The body member 60 includes a cylindrical wall 72 of substantially uniform circumference throughout and having an open lower end 74, and having at its upper end an inturned shoulder portion 78 terminating upwardly in a neck portion 80, preferably of cylindrical shape and having an exterior bead 82 at its upper end. The exact shape of the shoulder 78 and neck portion 80 need not be precisely as illustrated but may assume various shapes such as may be desirable from the standpoint of operations for forming the body member. Also, the design of such a feeder is not limited to its having a shoulder and neck portion at one end, since the design of the body member 10 in FIG. 6 could be conveniently utilized as to one end only without changing the principle or functioning of the feeder.

The body portion 60 may be made of any of various suitable materials, such as any of the known plastic materials that may be used in conjunction with food.

The nipple 62 may be a conventional nursing nipple formed of rubber or suitable rubber-like material and shaped complementally to the shape of the neck portion 80, and having a suitable internal peripheral groove 84 for receiving the rib 82 and thereby retaining the nipple on the body member, making a positive air-tight seal, so as to allow for proper functioning under the vacuum principle and to preclude the possibility of displacement during the feeding operation. The nipple 62 is provided with an aperture 86 which, as mentioned in connection with the first form of the invention, when used in connection with semi-solid foods, is relatively large such as on the order of ⅛ inch in diameter, but a nipple having a considerably smaller aperture is used in connection with milk or other liquids.

A piston or follower to be inserted into the body member as described fully hereinbelow is shown at 88. This piston may be of the same material of which the body member is made, and includes a top transverse element or disc 90 (FIG. 14) and a surrounding flange or skirt 92 disposed in trailing direction relative to the movement in following the food. The flange 92 has an axial dimension suitable for maintaining the piston in proper transverse position and for making a positive and movable seal between that flange 92 and the inside surface of the wall of the body member. The transverse element or disc 90 of the follower may be shaped similarly to the shape of the shoulder 76 to minimize space between the piston and the upper end of the feeder in the corresponding limit position of the piston, and obtain maximum expulsion of food from the feeder in the feeding operation. The piston is provided with a finger grip 94 of suitable dimensions, extending downwardly from the transverse portion 90 and preferably being contained within the axial confines of the flange so as to allow the feeder to rest in an upright position with the piston inserted at the extreme open end. This finger grip is utilized for gripping the piston by the fingers for facilitating its insertion into the body member and removal therefrom. It may be desired to provide an aperture 98 in the finger grip element 94, to receive a hook to facilitate removal of the piston when the latter is disposed in its innermost position in the body member, and a string 100 may be secured in the aperture for gripping by an adult for removing the piston. Preferably the string is relatively short to render it difficult for the baby to grasp it and pull it. The form of piston 18 included in the form of FIGS. 1 to 6 may be utilized in the present form, instead of the piston 88, if desired.

In the use of the present feeder, the original container or can 64 of baby food is opened by removing the top element. Then the body member 60, with the nipple preferably already attached, is inserted into the container in telescoping relation therein. The food in the container indicated at 96 is thereby disposed in the circular wall 72, it being understood that the latter is dimensioned for a relatively close fit with the inner surface of the wall 66 of the container. The insertion of the body member into the container may be performed relatively easily in view of the flowing nature of the food and the fit between the cylindrical wall 72 of the body member and the cylindrical wall 66 of the container. This fit is such as to enable a relatively free sliding action but sufficiently close to prevent any food from being displaced out of the container through the space between these two wall members.

After the feeder is inserted into the container as above described, the assembly of these two members is inverted to the position shown in FIG. 12, and then the feeder is held in one hand and the container gripped by the other hand and removed from the feeder. The length or axial dimension of the body member 60 may be greater than that of the container 64 to facilitate gripping the feeder in removing the container therefrom. After removal of the container as just described, the piston 88 is inserted in the open end of the body member which is then uppermost as indicated in FIG. 13. It is then preferable to return the feeder to an upright position, thus causing the food to settle away from the nipple. Then the piston may be inserted further into the body member, thereby causing the food to move up into the nipple while at the same time displacing the air that was in the feeder.

The foregoing steps having been accomplished, the feeder is then ready for use. In the feeding operation, the present baby food feeder may be considered similar to that described above (FIGS. 1 to 6) in the sense that it may assume any position with equal effectiveness, i.e., it need not be in an "inverted" position with the nipple lowermost in order for it to function properly. In fact, it may be disposed generally horizontally or even "upright" in the position of FIG. 10 without any loss of efficiency. The withdrawal of the food from the feeder produces relatively great atmospheric pressure on the piston which in turn forces the food in front of it along through the feeder and into the nipple.

There is virtually no chance for the food to spill out either end of the feeder, since the piston makes a positive seal at one end and the only opening at the opposite end is the small hole in the nipple, which is inside the baby's mouth.

Notwithstanding the fact that the present feeder possesses the novel and important feature that food may be transferred into it bodily and totally by a single manipulation, it is nevertheless possible to transfer the food from the original container by other methods such as by spooning or pouring it by simply removing the piston 88 and inserting. And as mentioned previously, where the feeder is provided with a larger neck or open end equal to the diameter of the body member, the piston may be inserted first and the food placed into the feeder via the neck or opposite end.

In the use of the device of the present invention a baby may be fed with great convenience in travelling, without in any way spilling food, or forming a mess as is common in feeding babies foods other than milk. Jars or cans of baby food as sold in the stores may be carried for travelling, together with the feeder of the present invention, and when it is desired to feed the baby, the food is easily removed from the jar in which it is sold and placed in the feeder. This may be done without spilling any of the food.

A still greater advantage is that the baby food feeder itself may be filled, particularly in the case of semi-solid food, before starting on a trip. And when it is time to feed the baby, the food need merely be removed from the carrying case and immediately used for feeding the baby. There is no danger of the food being lost from the feeder, since the only practical way it may be removed is by reducing the pressure in the space containing the food, whereby atmospheric pressure acts on the follower. If desired, an overcap 39 such as illustrated in FIG. 1 may be utilized for fitting over the nipple in the present case, to prevent accidental squeezing of the nipple by an object resting thereon.

Since it is not necessary to hold the feeder in any particular position, such as the nipple end down, in order for feeding to be effective, the need of constantly checking to see if the bottle is tilted properly is eliminated. And the baby, while still very young, may hold the bottle himself.

As already indicated, it may be unnecessary in many instances for the feeder to be held at all, and it may fall or recline in random positions while the baby is feeding from it. Upon any food being withdrawn, regardless of the position of the feeder, the piston follows the level of the food under the influence of atmospheric pressure thereon due to the effective sealing action between the follower and body member, thus precluding air from entering into the space where the food is. As a consequence, the baby does not draw any air in the feeding action.

There are no moving parts projecting to the exterior of the device to render it vulnerable to expulsion of the food due to knocking against other objects. The only movable element, i.e., that which is bodily movable, is the piston (18, 88) and this member is entirely enclosed within the body member or container (10, 60) and is not subject to accidental movement by other objects which might be encountered in placing the feeder in a carrying case or even placing it on the table. And in the second form of feeder, the pull string 98 is short and flexible. It cannot accidentally catch on anything to cause the piston to be removed, and a young baby would be incapable of pulling the piston by means of the string. Also, when baby gets a little older, if the mother still desires to use the feeder, the pull string may easily be removed from the finger grip. Then, removal of the piston from the feeder upon completion of baby's feeding may be accomplished easily after removing the nipple by use of a spoon handle pressed upon the top of the piston, thereby backing the piston out of the body member through the large open end of the feeder.

While I have disclosed herein certain preferred forms of the invention, it will be understood that changes may be made within the scope of the appended claims.

I claim:

1. A baby food feeder of the character disclosed comprising a tubular body member having a uniformly cylindrical inner surface extending its full length with full diameter openings at both ends, the body member being adapted for containing a quantity of flowable food, a mouthpiece having an aperture therein detachably mounted on one end of the body member and forming an air seal therewith, the opposite end of the body member defining substantially the corresponding end of the device, and preformed piston means in the body member insertible through said opposite end thereof and movable in leading direction in the body member toward food therein, said piston means including a pair of axially spaced transverse elements a leading one of which faces the food and engages the inner surface of the body member, said leading element including a central substantially planar main portion and a conical peripheral portion flexible relative to the central portion and inclined in trailing direction relative to the central portion, said leading element having a possible diameter greater than the body member due to the inclination of the peripheral portion and tendency to spreading toward planar position by friction between itself and the body member in movement thereof in trailing direction, thereby enabling movement of the piston means more easily in leading direction than in trailing direction, the trailing one of the elements having a portion substantially planar in form and a peripheral portion at least as far in trailing direction as the planar portion, the trailing element also at least closely approaching the inner surface of the body member in diameter and sufficiently spaced from the leading element as to be operative for maintaining the piston means in co-axial alignment with the body member in all positions along the body member, the piston means being contained in axial direction between the respective front and rear planar surfaces of the leading and trailing elements, the piston means further being free of mechanical connection with all other parts of the feeder including the body member and movable without restriction, by other than food in the body member and contact friction with the body member, throughout the full length of the body member and thus movable substantially completely to the end of the device opposite the mouthpiece, said opposite end of the body member being freely vented to atmosphere.

2. The invention set out in claim 1 in which the trailing element of the piston means is rigid at its periphery relative to the leading element.

3. The invention set out in claim 1 in which the trailing element of the piston means is slightly, but only slightly, smaller than the inner diameter of the body member whereby to avoid dragging effect on the trailing element on the body member, and the spacing of the elements is substantial relative to the diameter of the piston means.

4. The invention set out in claim 1 in which the piston means is an integral member and the trailing element thereof is annular in form and connected to the leading element by a tubular element of substantial diameter.

5. The invention set out in claim 4 in which a finger grip element is provided in the piston means extending diametrically, and also extending axially in trailing direction, from the leading element of the piston means within the tubular element thereof and terminating adjacent the trailing surface of the trailing element.

References Cited in the file of this patent
UNITED STATES PATENTS

| | | |
|---|---|---|
| 950,710 | Williams | Mar. 1, 1910 |
| 1,956,073 | Krause | Apr. 24, 1934 |
| 2,303,997 | Hogg | Dec. 1, 1942 |
| 2,469,489 | Allen et al. | May 10, 1949 |
| 2,907,485 | Lunden | Oct. 6, 1959 |